United States Patent
Levin et al.

[11] Patent Number: 5,852,633
[45] Date of Patent: Dec. 22, 1998

[54] METHOD FOR ALLOCATING DATA IN A DATA COMMUNICATION SYSTEM

[75] Inventors: Howard E. Levin; Jeffrey P. Gleason, both of Austin, Tex.

[73] Assignee: Motorola, Inc., Schaumburg, Ill.

[21] Appl. No.: 660,380

[22] Filed: Jun. 7, 1996

[51] Int. Cl.[6] .............................. H04K 1/10; H04L 27/28
[52] U.S. Cl. ......................... 375/260; 370/464; 370/333; 371/5.1; 375/377
[58] Field of Search .................................. 375/260, 240, 375/254, 285, 296, 377; 370/464, 468, 216, 241, 252, 317, 333, 436, 458, 442, 480; 371/5.1, 5.2, 5.5, 57.2, 64, 65, 67.1

[56] References Cited

U.S. PATENT DOCUMENTS

| | | |
|---|---|---|
| 4,328,581 | 5/1982 | Harmon et al. . |
| 4,833,706 | 5/1989 | Hughes-Hartogs . |
| 5,309,503 | 5/1994 | Bruckert et al. ........................... 379/60 |
| 5,400,322 | 3/1995 | Hunt et al. . |
| 5,475,864 | 12/1995 | Hamabe ................................ 455/33.1 |
| 5,479,447 | 12/1995 | Chow et al. ............................. 375/260 |
| 5,548,819 | 8/1996 | Robb ........................................ 455/59 |
| 5,596,604 | 1/1997 | Cioffi et al. ............................. 375/260 |
| 5,598,435 | 1/1997 | Williams ................................. 375/261 |
| 5,603,082 | 2/1997 | Hamabe ................................. 455/33.1 |

OTHER PUBLICATIONS

John M. Cioffi; "DMT Information Bus for Muitidrop Interface on Existing Wiring;" Amati Communications Corporation; pp. 1–6 (Jun. 6, 1994).

Chow, et al.; "A Practical Discrete Multitone Transceiver Loading Algorithm for Data Transmission over Spectrally Shaped Channels;" IEEE Trans. on Comm., vol. 43, No. 2/3/4; pp. 773–775 (1995).

Draft American National Standard for Telecommunications; "Asymmetric Digital Subscriber Line (ADSL) Metallic Interface;" American Nat'l Standards Institute, Inc.; pp.i–xii, 2–171 (1994).

*Primary Examiner*—Wellington Chin
*Assistant Examiner*—Jean B. Corrielus
*Attorney, Agent, or Firm*—J. Gustav Larson; Daniel D. Hill

[57] ABSTRACT

A communications system (30) includes a transceiver (42) for transmitting data from a plurality of bins. Specifically, the BER of the bins is substantially equalized by allocating data by determining a projected margin. The projected margin is calculated for each bin by subtracting a reference signal-to-noise value from an estimated bin signal-to-noise value. The reference signal-to-noise value is predetermined by theoretical calculation or empirical data and stored in a look-up table. Bits are allocated to the bin having the maximum projected margin. This provides the best BER without changing the transmit power.

39 Claims, 6 Drawing Sheets

| SNR TABLE ||
|---|---|
| BITS | SNR$_{REF}$ |
| 2 | 14 |
| 3 | 19 |
| 4 | 21 |
| 5 | 24 |
| 6 | 27 |
| 7 | 30 |
| 8 | 33 |
| 9 | 36 |
| 10 | 39 |
| 11 | 42 |
| 12 | 45 |
| 13 | 48 |
| 14 | 51 |
| 15 | 54 |

*FIG.2*

METHOD FOR ALLOCATING DATA IN A DATA COMMUNICATION SYSTEM

CROSS REFERENCE TO RELATED APPLICATIONS

A related application entitled "Method For Fine Gains Adjustment In An ADSL Communications System", by Levin, and having Attorney Docket Number SC90011A, is filed concurrently herewith, and assigned to the assignee hereof.

FIELD OF THE INVENTION

This invention relates generally to communications, and more particularly, to a method for allocating data in a data communications system.

BACKGROUND OF THE INVENTION

In order to make high data rate interactive services such as video conferencing and internet access available to more residential and small business customers, high-speed data communication paths are required. Although fiber optic cable is the preferred transmission media for such high data rate services, it is not readily available in existing communications networks, and the expense of installing fiber optic cable is prohibitive. Current telephone wiring connections, which consist of copper twisted-pair media, was not designed to support the data rates, or bandwidth, required for interactive services such as video on demand or even high speed internet connections. Asymmetric Digital Subscriber Lines (ADSL) technology has been developed to increase the effective bandwidth of existing twisted-pair connections, allowing interactive services to be provided without requiring the installation of new fiber optic cable.

Discrete Multi-Tone (DMT) is a multicarrier technique that divides the available bandwidth of twisted-pair connections into many subchannels, or bins. The DMT technique has been adopted by the ANSI T1E1.4 (ADSL) committee for use in ADSL systems. In ADSL, DMT is used to generate 250 separate 4.3125 kHz subchannels from 26 kHz to 1.1 MHz for downstream transmission to the end user, and 26 subchannels from 26 kHz to 138 kHz for upstream transmission by the end user. The transmission capability of the individual bins are evaluated for each connection, and data is allocated to the subchannels according to their transmission capabilities (the number of bits each bin can support). Bins that are not capable of supporting data transmission are not used, whereas the bit-carrying capacity of bins that can support transmission is maximized. Thus, by using DMT in an ADSL system, the transmission capability of each twisted-pair connection is maximized over the fixed bandwidth.

Once the transmission capability of a connection has been established, the data transfer process begins by encoding the data. Data in an ADSL system is encoded as a frequency-domain vector set and grouped in frames, where a frame represents a time-slice of the data to be transmitted. A frame of data is constructed by allocating bits based on performance of the individual bins.

Prior to sending real data, the ADSL system needs to be initialized by specifying how many bits each bin will contain. Prior art methods of initializing included using an equation. By using an equation approach, the result in initialization is subject to suboptimal bit-error-rate (BER) performance. Therefore, a method not relying on assumptions of the prior art is needed.

Because allocation of fractional bits is not possible, it is likely that there will be different amounts of excess or deficit signal-to-noise ratios SNR, called margin. Differences in margin lead to different BER's for each bin. These differences in BER's effect overall system performance. While the SNRs can be equalized for each bin by increasing or decreasing the transmit power associated with each bin, this is done at the expense of the analog front end which needs to be designed for a specific power requirement. Therefore, a method is needed for equalizing the margins, and therefore the BER, to obtain optimal system performance, while the total aggregate transmit power remains constant.

During the transmission of real data, its likely that conditions of the transmission channel will change from those during initialization. Variations in frequency dependent noise and temperature affect the individual bin BER's to different degrees. Therefore, the need exists to maintain the BER performance of the system during transmission.

BRIEF DESCRIPTION OF THE DRAWINGS

FIG. 2 illustrates, in tabulator form, example reference signal-to-noise ratios in accordance with the present invention.

DESCRIPTION OF A PREFERRED EMBODIMENT

Generally, the present invention provides a method for allocating bits in the bins of an ADSL communications system, and equalizing the BER of the bins without substantially increasing aggregate transmit power. In particular, the bits are allocated by determining a projected margin. The projected margin is calculated for each bin by subtracting a reference SNR value from an estimated bin SNR. The reference SNR value is predetermined by theoretical calculation or by empirical data and stored in a look-up table. Bits are then allocated to the bin having the maximum projected margin. This provides the best BER without changing the transmit power.

The BER is further improved by iteratively equalizing the individual bin BERs. This is accomplished by applying a fine gains adjustment to the transmit power. Specifically, the BER of the bins is equalized by calculating an adjustment gain and subtracting the adjustment gain from the bin currently having the maximum margin, and adding the same adjustment gain to the bin currently having the minimum margin. The iterations continue until all of the bin margins are within a predetermined threshold. This changes the individual bin transmit power levels without substantially changing the aggregate transmit power level. Also, the BER is substantially equalized, without causing the individual transmit power levels from exceeding a predetermined range, such as the range required by ANSI T1E1.4.

Figure 1:
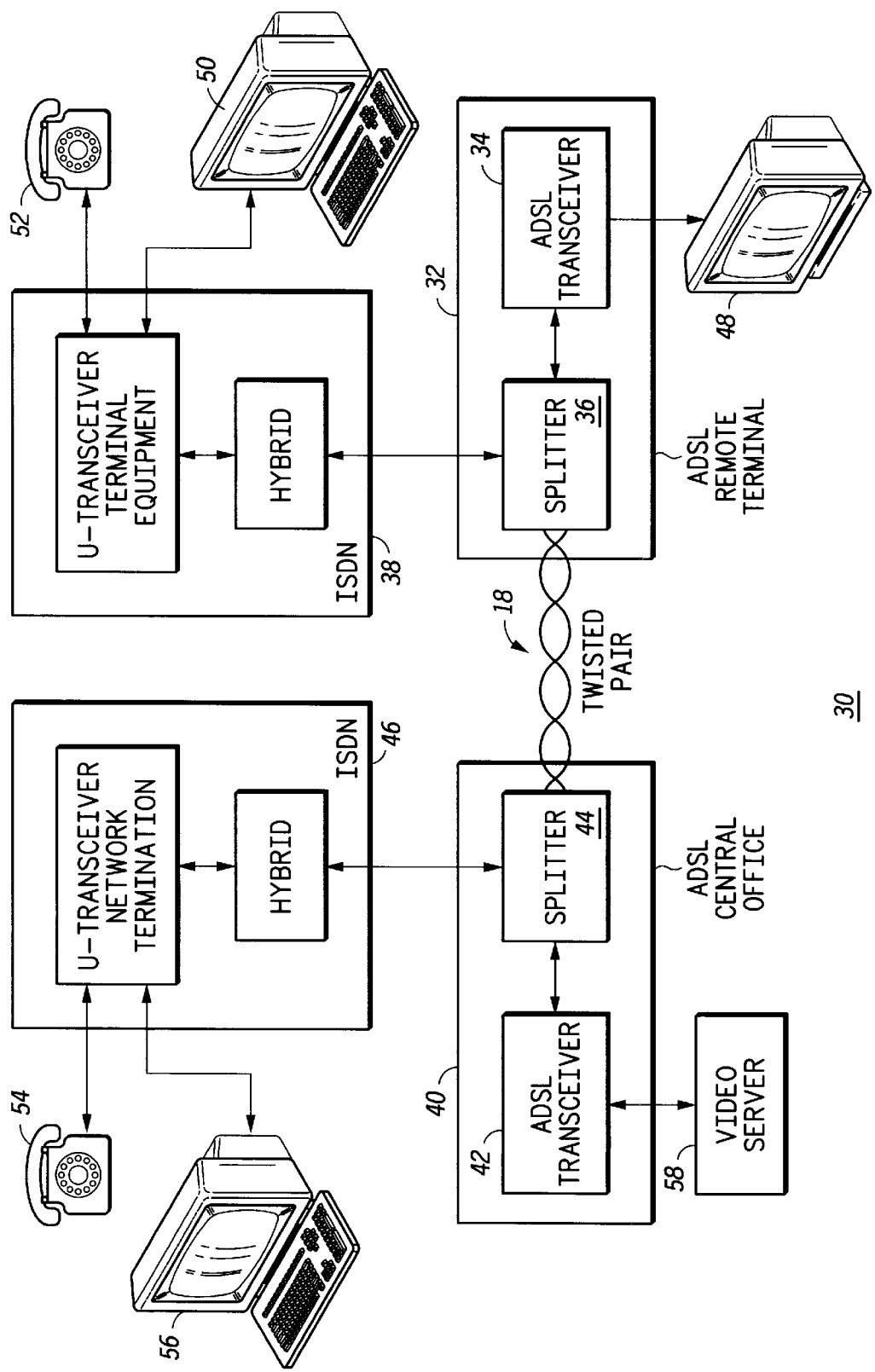
FIG. 1 illustrates, in block diagram form, an asymmetric digital subscriber line (ADSL) system with accordance with the present invention.

FIG. 1 illustrates, in block diagram form, a communication system 30 according to the present invention. Communication system 30 allows simultaneous transmission of ISDN and ADSL over the same telephone line, and includes ADSL central office 40, ADSL remote terminal 32, ISDN transceiver 38, and ISDN transceiver 46. ADSL remote terminal 32 includes ADSL transceiver 34 and splitter 36. Coupled to ADSL remote terminal 32 may be a communications device, such as television receiver 48. Twisted pair 18 couples the ADSL remote terminal 32 to the ADSL central office 40. Coupled to ADSL central office 40 may be a communications device, such as video server 58.

ADSL central office 40 includes ADSL transceiver 42 and splitter 44. Splitter 44 couples ADSL transceiver 42 to twisted pair 18, and splits received ISDN and ADSL signals to the appropriate corresponding receiver. Likewise, splitter 44 couples transmitted signals from both the ISDN transmitter and the ADSL transmitter to twisted pair 18. Splitter 44 includes band pass filter circuits for isolating the received ADSL signals from the ISDN signals, and circuits for combining the ADSL signals with the ISDN signals for transmission over the twisted pair. Splitter 36 functions in the same manner as splitter 44, and splits or combines ADSL and ISDN signals as necessary.

Communications devices, such as telephone 52 or computer terminal 50 may be coupled to ISDN transceiver 38. Likewise, coupled to ISDN transceiver 46 may be computer terminal 56 and/or telephone 54. In operation, communication system 30 allows simultaneous transmission and reception of ISDN and ADSL signals on twisted pair 18. ADSL transceiver 34 transmits an upstream ADSL signal across twisted pair 18 to ADSL central office 40. ADSL transceiver 42 receives the upstream data signal from ADSL transceiver 34. ADSL transceiver 34 shifts or modifies the upstream ADSL signal up to a higher frequency band than that used by an ISDN network. The modified upstream ADSL signal can be transmitted along twisted pair 18 simultaneously with the ISDN signal. An ADSL receiver of ADSL transceiver 42 of the central office 40 band pass filters the ISDN signal and returns the modified upstream ADSL signal back to its original spectral band where it is converted to digital output data for use by a DSP. The downstream ADSL from ADSL central office 40 is modified so that it does not use the frequency band occupied by the ISDN signal. This modification is accomplished by changing the cut off frequency of the high pass filter of the downstream transmitter of ADSL transceiver 42 and of the high pass filter of the downstream receiver of ADSL transceiver 34.

FIG. 2 illustrates a signal-to-noise ratio (SNR) table in accordance with the present invention. The BITS column represents the number of bits that are allocated to a bin. In the embodiment illustrated in FIG. 2, only 2 bits through 15 bits can be allocated to a bin. The $SNR_{REF}$ column contains the signal-to-noise reference value, which represents a predetermined signal-to-noise value associated with each number of bits. The $SNR_{REF}$ values of FIG. 2 are used later in the discussion of FIGS. 3–7.

Figure 3:
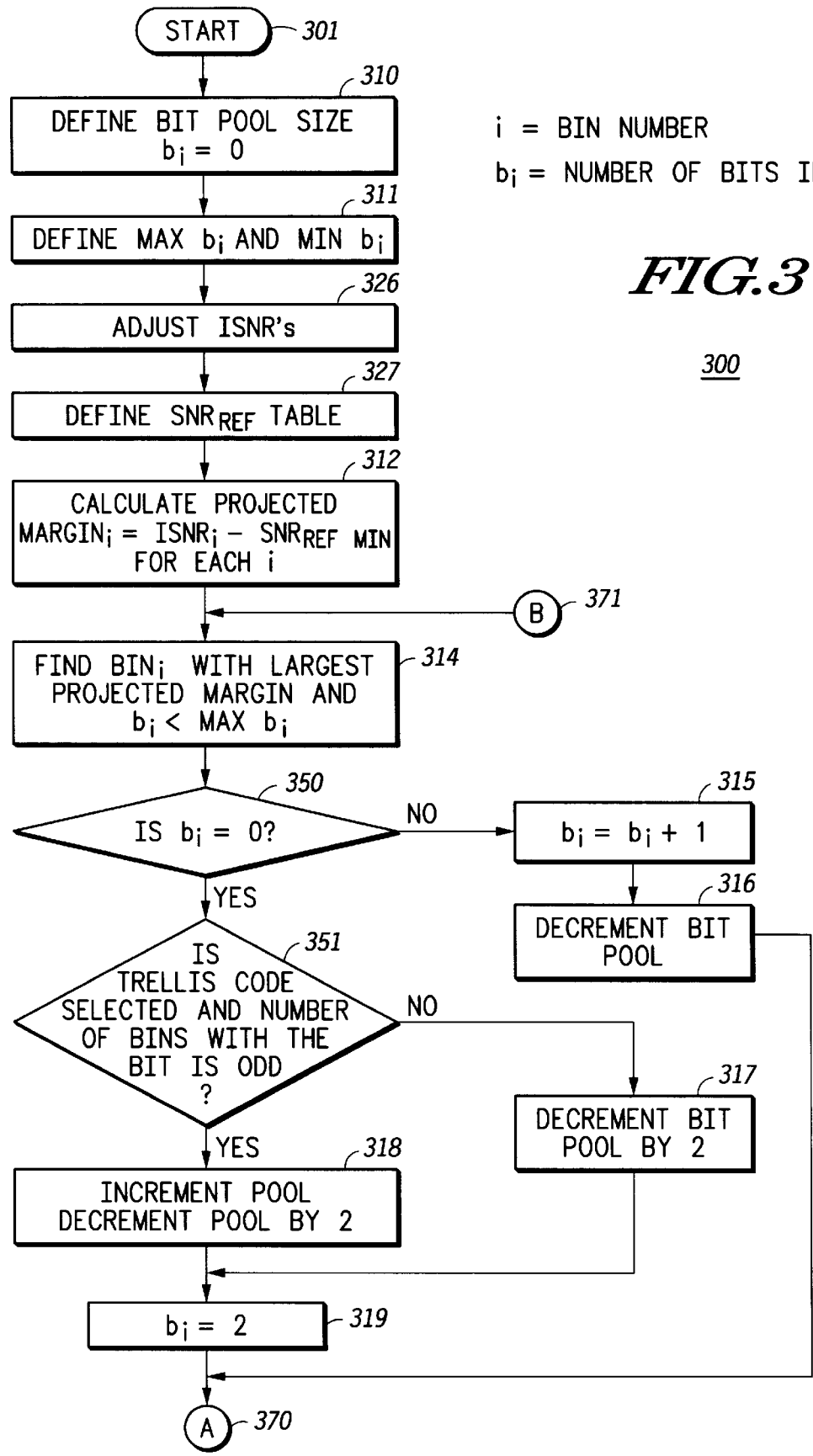
FIG. 3 and FIG. 4 illustrate, in flow diagram form, a method for bit allocation in the system of FIG. 1 in accordance with the present invention.
Figure 4:
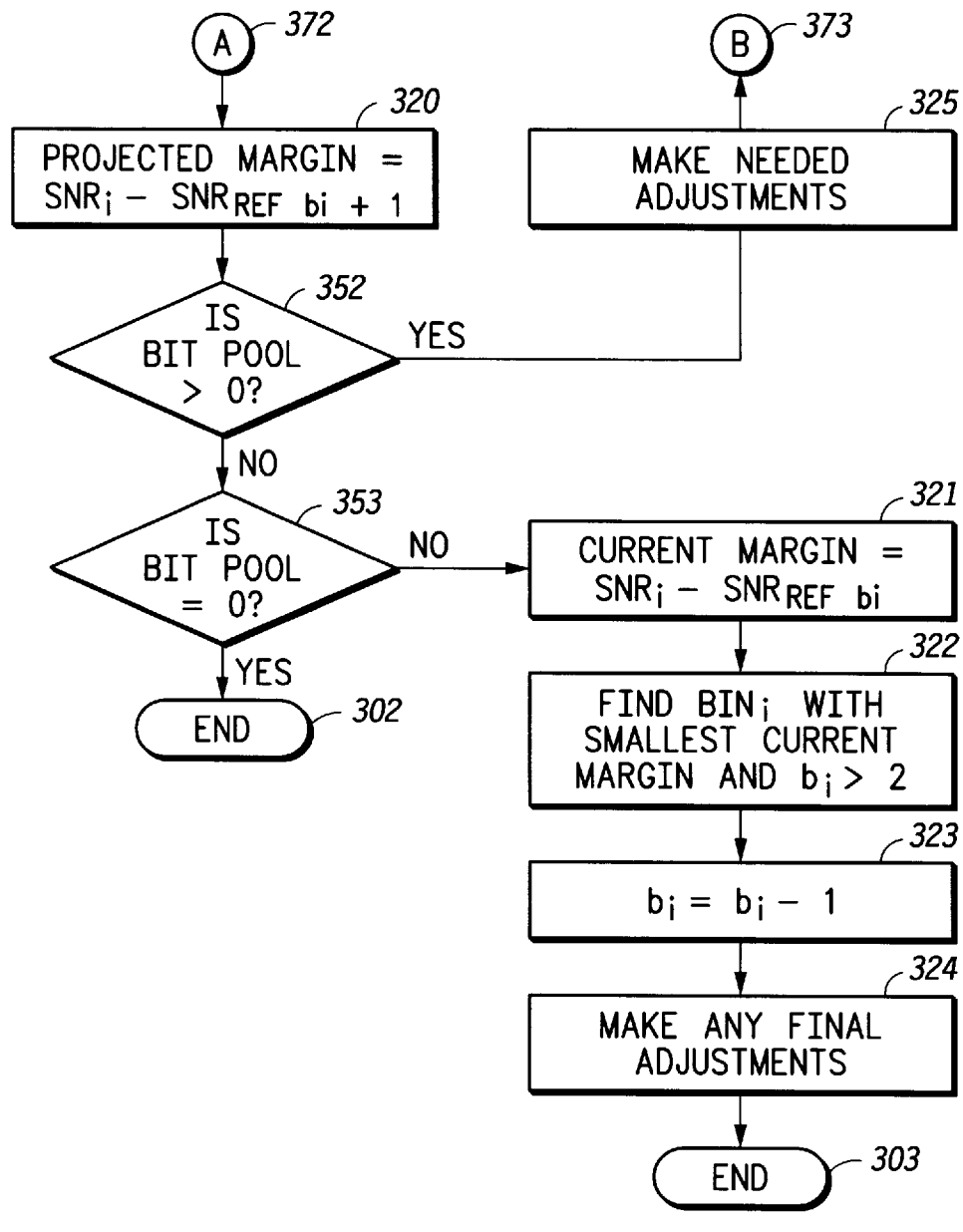

FIG. 3 and FIG. 4 represent, in flow diagram form, a method 300. The method 300 comprises oval transition blocks 301 through 303, rectangular step blocks 310 through 327, diamond shaped decision blocks 350 through 353, and circular change of flow blocks 370 through 373. In addition, the reference "i" refers to one of a plurality of bins, while the nomenclature "$b_i$" references the number of bits allocated to a specific bin i.

In accordance with one embodiment of the invention, the method 300 begins at step 301. Next, at step 310, a bit pool size is defined, and all $b_i$ values are set equal to 0. The bit pool size initially contains the number of data bits which need to be sent in a given ADSL frame, and represents the number of bits that need to be allocated to the plurality of bins. The bit pool value will change, as the method 300 progresses. Setting all $b_i$ values equal to 0 indicates that no bits have been allocated to any bin, and that a new frame is being constructed. Next, at step 311 a maximum and minimum number of bits which can be transmitted from any bin in a given frame is defined. For example, it may be desirable to limit the number of bits a given bin can send to eight. Likewise, it may be desirable to limit the minimum number of bits which a bin can send. For example, the ADSL standard does not allow a bin to send only one bit, nor more than 15.

Next at step 326 the initial SNR's, (ISNR) for the bins which were previously calculated during initialization are adjusted. If a bin is not to be used, the ISNR for that bin can be set to zero. If a bin is to be used, but not to its full capacity, the ISNR should be limited to a predetermined value. This allows the system to prohibit or limit transmissions at frequencies that may be simultaneously used by some other system.

At step 327 the $SNR_{REF}$ table is defined. The $SNR_{REF}$ for a given number of bits is the required SNR value which achieves a desired bit error rate, where the bit error rate is a measure of system performance. Initially, there is a base table that is specific to a selected BER, such as described in FIG. 2. In a system such as ADSL, error correction coding can be used to increase system performance. The increase in performance can be characterized by a coding gain. If error correction coding is used, a coding gain table can be subtracted from the base table, generating the $SNR_{REF}$ table to be used during allocation. Raising the values of the table allows for an allocation with extra margin to counteract transmission channel degradation.

Next, at a step 312, a projected SNR margin is calculated. In one embodiment of the invention the projected SNR margin is calculated by taking the initial SNR for each bin and subtracting off the signal-to-noise reference value, $SNR_{REF}$ for a projected number of bits.

If a bin already has N bits allocated, and the projected number of bits is N+P, the $SNR_{REF}$ value to be used is the one for N+P bits. In this embodiment, the minimum number of bits that a bin can contain is 2. Therefore, before any bits are allocated, the projected margin is based on having 2 bits allocated. The projected margin would be a bin's initial SNR, (ISNR) minus the $SNR_{REF}$ value for 2 bits. If using the table in FIG. 2, the resulting projected margin would be ISNR-14. If a bin currently has a total of 6 bits allocated to it, the next projected number of allocated bits would be 7 bits, for a projection increase of 1. Therefore, a bin having 6 bits currently allocated would have a projected signal-to-noise margin of ISNRi-30. The initial SNR for each individual bin is assumed to have been previously determined. Next, at step 314, the bin with the largest projected signal-to-noise margin that contains fewer than the maximum number of bits allowed is identified. This is the best bin in this embodiment.

Choosing the bin with the largest projected margin allows for optimal bit error rate and system performance. For example, if a first bin had a projected margin of 30, a second bin had a projected signal-to-noise margin of 5, the first bin would be chosen because its projected signal-to-noise margin value, after it is allocated more data, will allow for the lowest overall system bit error rate. If a given bin has 15 bits allocated, where 15 is the maximum number of bits allowed, no more bits can be allocated, and that bin will not be chosen regardless of its projected margin. As discussed above, it is understood that a maximum value besides 15 could be chosen, and that other criteria could be input by the user to limit selection of a bin.

Next, at step 350, a determination is made whether the number of bits allocated to the selected bin is equal to 0. If the number of allocated bits is not equal to 0, indicating that bits are already allocated to the bin, the method 300 proceeds to step 315. If this is the first time bits have been allocated to this bin, method 300 proceeds to step 351. At step 351, a determination is made whether some allocation dependent overhead bits are required, such as required by a trellis encoder. If no overhead bits are needed, flow proceeds to step 317. In the event overhead bits are required, flow proceeds to step 318.

At step 318, the bit pool is decremented. This decrementing of the bit pool represents the fact that the bit pool is effectively decremented by two because two bits have been allocated to this bin, and the bit pool was also incremented by one to indicate an overhead bit added which is required by the trellis encoder. It is understood that different values may be added to the bit pool. The combination of the decrementing by two and incrementing by one gives step 318 which is a single decrement to the bit pool for this embodiment. At step 317, the bit pool is decremented by two, which reflects that the fact that a total of two bits have been allocated to the selected bin. Flow from steps 317 and 318 continue at step 319.

At step 319, the bits are allocated by setting the number of bits allocated to the bin equal to 2. Next, at change of flow step 370, a flow is indicated to change to the top of the second portion flow 300 on FIG. 4. Next, at change of direction flow A 372, flow continues at step 320.

At step 320, the projected margin is recalculated for the selected bin. For example, if the best bin received data for the first time and now contains two allocated bits, the new projected margin would be the initial SNR of the selected bin less the $SNR_{REF}$ for its next possible allocation value of bits, in this case 3 bits, as determined from the table of FIG. 2. Next, at step 352, a determination is made whether or not the bit pool is greater than 0. In the event that the bit pool is greater than 0 flow continues at step 325.

At step 325, any needed adjustments are made pertaining to changes in desired data rate, additional overhead bits, or changes in allocation criterion.

Flow continues at step 314 (FIG. 3) where a portion of the method 300 will be repeated until the bit pool is less than or equal to 0. In another embodiment, the step 325 could be performed only initially following step 311. If the bit pool is not greater than 0, flow continues at step 353.

At step 353 a determination is made whether or not the bit pool is equal to 0. If the bit pool is equal to 0, flow proceeds to step 302 and the method 300 ends. In the event the bit pool is not equal to 0, (i.e., the bit pool is less than 0), flow continues at step 321. For example, if upon returning to step 314 there were a single bit remaining to be allocated, and a bin were chosen which had no previously allocated bits, that bin would have to be allocated a total of two bits, even though only one bit remains. Therefore, it is possible to have a bit pool value of less than 0. At step 321, the current margin for all bins is calculated. The current margin for each bin, as opposed to the projected margin, is the initial signal-to-noise less the signal-to-noise reference for the bits allocated to each bin from the table of FIG. 2. Next at step 322 the bin with the smallest current margin is selected that also has more than two bits allocated to it. Next at step 323, one bit is de-allocated from this bin. For example, if a bin has four bits allocated to it and has the smallest current margin its number of allocated bits would be reduced from four to three. Next at a step 324, any final adjustments are made. One situation where a final adjustment would need to be made would be in the event a bit needs to be de-allocated, but all the bins contain exactly two bits. In this situation, no single bit can be de-allocated from any bin. Therefore, it would be necessary to combine two bins together so that it had a total allocated bit number of 4 from which a single bit could be de-allocated. Other type of anomalies may occur and would be taken care of in step 324. Next at step 303 the method 300 ends.

Figure 5:
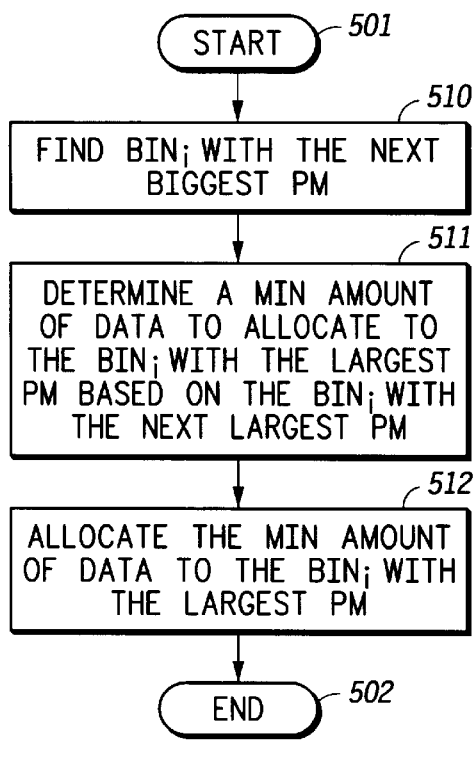
FIG. 5 illustrates, in flow diagram form, a method for bit allocation in the system of FIG. 1 in accordance with the present invention.

FIG. 5 represents, in flow diagram form, a method 500. The method 500 comprises oval transition blocks 501 and 502, and rectangular step blocks 510 through 512.

In FIG. 5, flow 500 provides a modification to the flow 300 in accordance with the present invention. At step 501 the flow 500 starts. Next, at step 510, the bin with the next largest projected margin is determined. This is the next best bin. Next, at step 511, the amount of data that the best bin can be allocated is determined. The best bin will be allocated enough data so that it will have a new projected margin worse than that of the next best bin. This can be determined by subtracting the projected margin of the next best bin from the projected margin of the best bin to get a projected margin difference. Based on the projected margin difference, the number of bits that can be allocated to the best bin can be determined by the table in FIG. 2. For example, assuming the best bin and next best bin are empty, if the best bin has a projected margin of 40, and the next best bin has a projected margin of 15, the projected difference is 25. Referring to the table in FIG. 2, six bits would be chosen to be allocated to the best bin. Six bits are chosen because that is the smallest number of bits with a signal-to-noise reference greater than or equal to the projected difference. If the best bin has bits already allocated, the six bits would represent the total number of bits that the bin should have allocated. The flow 500 could be inserted between steps 314 and 350 of FIG. 3, and would eliminate the need for the allocation steps of FIG. 3.

Figure 6:
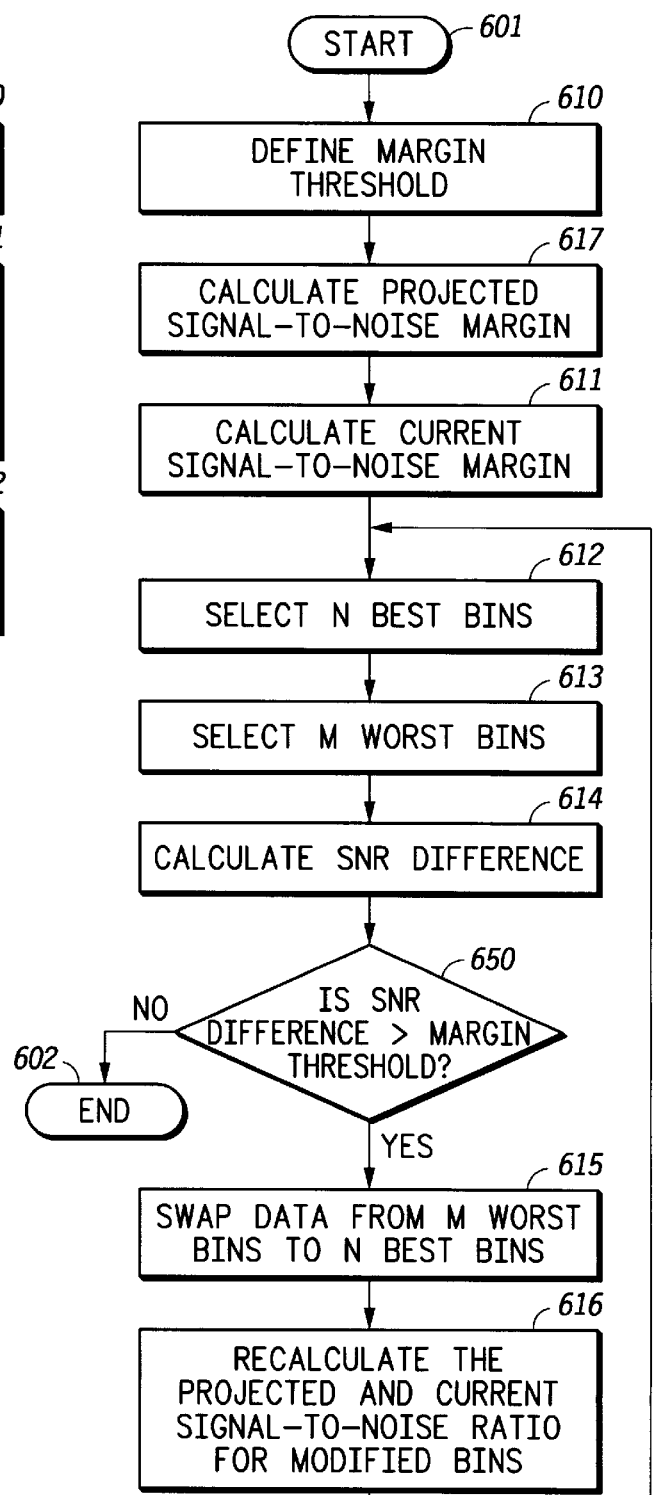
FIG. 6 illustrates, in flow diagram form, a method for bit re-allocation in the system of FIG. 1 in accordance with the present invention.

FIG. 6 represents, in flow diagram form, a method 600. The method 600 comprises oval transition blocks 601 and 602, rectangular step blocks 610 through 617, and diamond shaped decision block 650. This flow describes the method of determining if an allocation adaptation is necessary, and if so, what adaptation should occur.

At step 601 the flow 600 starts, and assumes a frame with bits already allocated has been identified. Next, at step 610, a threshold is defined. The threshold is used to determine if an adaptation should occur. Next, at step 617, the projected signal-to-noise margin is calculated in a similar manner to that of step 312 (FIG. 3). Next, at step 611, the current signal-to-noise margin is calculated in a similar manner to step 321 (FIG. 3). Next, at step 612, the N best bins are selected. N is an integer value and is user defined. In one embodiment of the present invention, the N best bins are those bins having the largest projected signal-to-noise margin. Next, at step 613, the M worst bins are selected. M is an integer value and is user defined. The M worst bins are those bins having the smallest current signal-to-noise margin. Next, at step 614, the signal-to-noise difference between the best of the N best bins and the worst of the M worst bins is calculated. Next, at step 650, a determination is made whether the signal-to-noise difference is greater than the margin threshold. If yes, flow proceeds to step 615; if no, flow ends by proceeding to step 602. At step 615, data is swapped from the M worst bins to the N best bins making sure not to violate a minimum or maximum bit value. In one embodiment, a single bit would be swapped. Next, at step 616, the projected and current SNRs are recalculated. A portion of the flow 600 repeats by returning to step 612.

Figure 7:
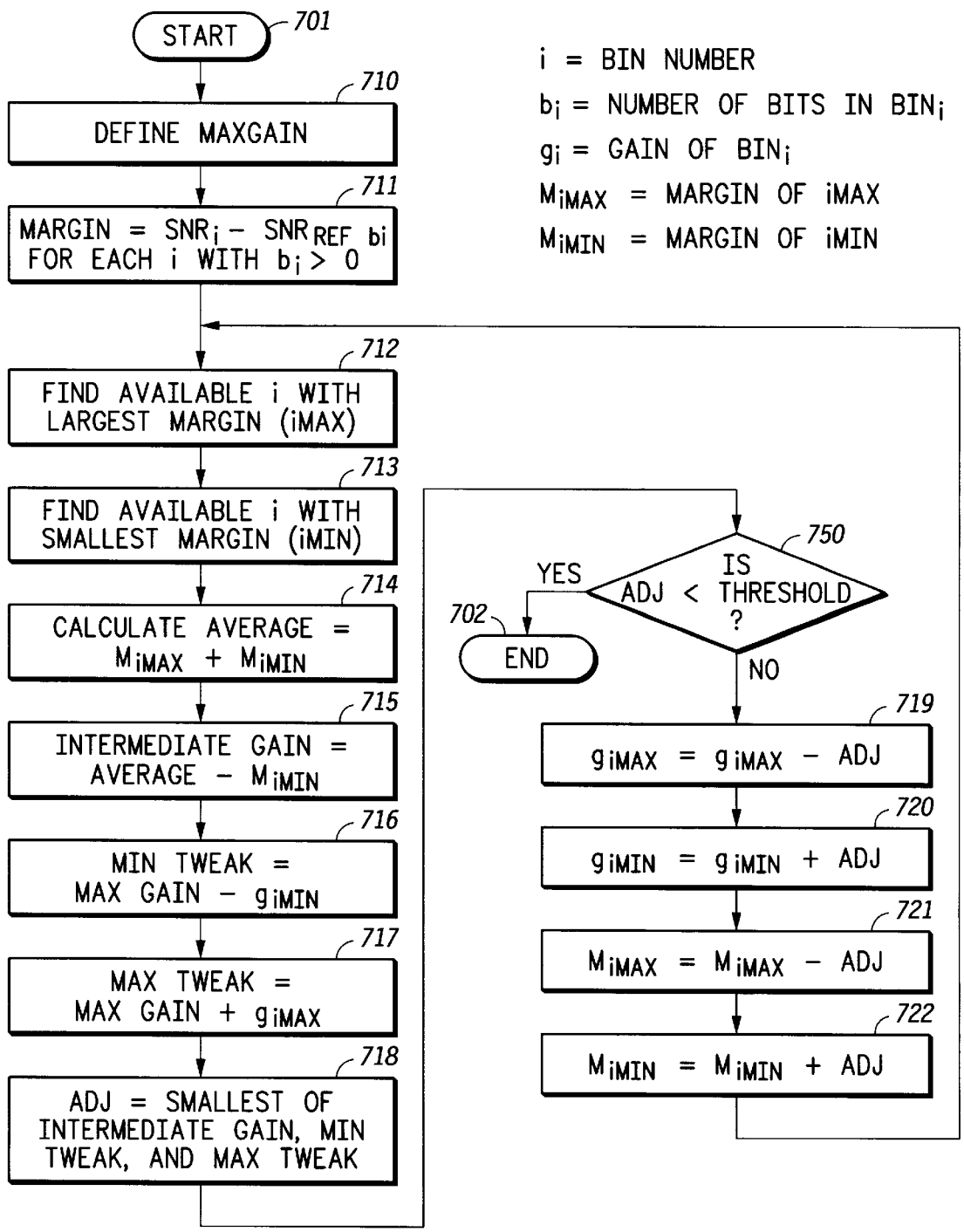
FIG. 7 illustrates, in flow diagram form, a method for fine gains adjustment in the system of FIG. 1 in accordance with the present invention.

FIG. 7 illustrates, in flow diagram form, a method 700 for providing fine gains adjustment in accordance with an embodiment of the present invention. Method 700 includes rectangular boxes having reference numbers 710–718 and 719–722 representing steps for performing the fine gains adjustment, and a diamond shaped box having reference number 750 representing a decision step of method 700.

At step 710, a maximum gain is defined by a user of communications system 30. The maximum gain is defined as a maximum amount that the gain of a bin can be adjusted. For example, ANSI T1E1.4 requires that the maximum gain not be greater than approximately 1.5 decibels (dB). At step 711, a margin is calculated for each bin that has at least one bit allocated to it. This margin is determined by subtracting the reference signal-to-noise ratio value ($SNR_{REF}$) for each bin, as identified in the table of FIG. 2, from the initial signal-to-noise ratio (SNR) value for that bin. At step 712, the available bin with the largest margin is identified. A bin is available if the gain of the bin has been adjusted down by less than the maximum gain defined in step 710. At step 713, the available bin with the smallest margin is selected. As discussed above, a bin would be unavailable for selection if it had already been gained up by the maximum gain defined at step 710.

At step 714 an average of the maximum margin and the minimum margin is calculated. For example if the maximum margin is 8 dB and the minimum margin is 4 dB, the average would be 6 dB. Next, at step 715, an intermediate gain is calculated. The intermediate gain is determined in the illustrated embodiment by subtracting the minimum margin from the average calculated in step 714.

At step 716, a minimum tweak value is determined by subtracting the gain of the bin with the minimum margin from the maximum gain defined in step 710. The minimum tweak value is the amount in which the gain of the bin with the minimum margin can be adjusted up. Next, at step 717, the maximum tweak value is defined as the maximum gain defined at step 710, plus the gain of the bin having the maximum margin. The maximum tweak is the amount in which the gain of the bin with the maximum margin can be adjusted down.

Next, at step 718, an adjustment gain (ADJ) is determined by taking the smallest of the intermediate gain calculated at step 715, the minimum tweak determined at step 716, or the maximum tweak from step 717. This assures that the gain of each of the bins is not adjusted beyond the maximum gain from step 710. Also, when gain is added to a bin, a corresponding amount of gain is subtracted from another bin, thus ensuring that the aggregate transmit power levels do not substantially change.

At decision step 750, a determination is made whether or not the adjustment gain is below a predetermined threshold. The threshold is a predetermined value below which no further fine gains adjustments are needed. If the adjustment value is less than the threshold, the YES path is taken to END step 702. If the adjustment value is not less than the threshold, the NO path is taken to step 719. In an ideal system, the threshold may be equal to zero.

At step 719, the gain corresponding to the maximum margin is decreased by the adjustment value. At step 720, the gain corresponding to the minimum margin is increased by the adjustment value. At step 721, the maximum margin is decreased by the adjustment value. At step 722, the minimum margin is increased by the adjustment value. From step 722, the flow diagram returns to step 712, and steps 712–722 are repeated until the adjustment gain is less than the threshold. Because the gain of one bin is not adjusted up without another the gain of another bin being adjusted down by a corresponding amount, an aggregate change in margin for all of the bins is substantially zero.

While the invention has been described in the context of a preferred embodiment, it will be apparent to those skilled in the art that the present invention may be modified in numerous ways and may assume many embodiments other than that specifically set out and described above. For example, the present invention is implemented in software. However, in other embodiments, the invention may be implemented in hardware, software, or a combination of hardware and software. Accordingly, it is intended by the appended claims to cover all modifications of the invention which fall within the true spirit and scope of the invention.

We claim:

1. A method of allocating data in a data communication system having a plurality of bins for sending data, the method comprising the steps of:

defining an initial signal-to-noise value for each of the plurality of bins;

defining a reference signal-to-noise value, wherein the reference signal-to-noise value is based at least partially on data allocation;

calculating a projected signal-to-noise margin for each of the plurality of bins based on the initial signal-to-noise value and the reference signal-to-noise value;

selecting a best bin from the plurality of bins based on the projected signal-to-noise margin; and allocating a portion of the data to the best bin.

2. The method of claim 1, wherein the step of calculating a projected signal-to-noise margin further comprises calculating the projected signal-to-noise margin by subtracting the reference signal-to-noise value from the initial signal-to-noise value.

3. The method of claim 2, wherein the step of calculating a projected signal-to-noise margin further comprises the reference signal-to-noise value being an amount of signal-to-noise needed for an allocated amount of data at a given bit error rate.

4. The method of claim 1 further comprising the steps of:

recalculating the projected signal-to-noise margin for the best bin; and repeating the steps of calculating, selecting, allocating, and recalculating.

5. The method of claim 4, wherein the step of allocating bits includes:

allocating at least one bit of a bit pool comprising at least one bit of data to the best bin.

6. The method of claim 5, further comprising the step of:

removing at least one bit from the bit pool.

7. The method of claim 6, further comprising the step of:

removing at least one bit from the bit pool during a transmission.

8. The method of claim 5, further comprising the step of:

adding at least one bit to the bit pool.

9. The method of claim 8, further comprising the step of:

adding the at least one bit to the bit pool during a transmission.

10. The method of claim 8, wherein the step of allocating further comprises:

allocating a group of bits having a minimum number of bits and a maximum number of bits.

11. The method of claim 10, wherein step of allocating a group of bits includes allocating when the minimum number of bits is 2 and the maximum number of bits is 15.

12. The method of claim 8, the step of adding bits further includes:

adding bits to the bit pool for system overhead requirements.

13. The method of claim 8, wherein the step of adding bits further includes:

adding bits to the bit pool when the bit pool is equal to zero; and repeating the steps of calculating, selecting, allocating, and recalculating while the bit pool has a value greater than zero.

14. The method of claim 5, wherein the step of allocating comprises:

allocating at least two bits of the bit pool of data to the best bin.

15. The method of claim 14, further comprising the steps of:

updating a pool value representing a total number of bits in the bit pool of data by decrementing the pool value based on a number of bits allocated; and the step of repeating includes repeating the steps of calculating, selecting, allocating, and recalculating while the pool value is greater than zero.

16. The method of claim 1, further comprising the step of:

calculating new reference signal-to-noise values.

17. The method of claim 16, wherein the step of calculating new reference signal-to-noise values further includes:

calculating new reference signal-to-noise values based on a coding gain.

18. The method of claim 16, wherein the step of calculating new reference signal-to-noise values further includes:

calculating new reference signal-to-noise values based on a user supplied variable.

19. A method of allocating data in a data communication system having a plurality of bins for sending data, the method comprising the steps of:

defining an initial signal-to-noise value for each of the plurality of bins;

defining a reference signal-to-noise value;

calculating a projected signal-to-noise value and the reference signal-to-noise value;

selecting a best bin from the plurality of bins based on the projected signal-to-noise margin and a user supplied weighting, wherein the user supplied weighting can prevent a bin from being selected;

allocating a portion of the data to the best bin.

20. A method of allocating data in a data communication system having a plurality of bins for sending data, the method comprising the steps of:

defining an initial signal-to-noise value for each of the plurality of bins;

defining a reference signal-to-noise value, wherein the reference signal-to-noise value is an amount of signal-to-noise needed to allocate a given amount of data at a given bit error rate;

defining a pool having at least one bit of unallocated data;

calculating a projected signal-to-noise margin for each of the plurality of bins based on the initial signal-to-noise value and the reference signal-to-noise value;

selecting a best bin from the plurality of bins based on the projected signal-to-noise margin, wherein the best bin has a largest projected signal-to-noise margin;

allocating a portion of the pool to the best bin;

decrementing the pool based on the portion; and repeating the steps of calculating, selecting, allocating, and decrementing until the pool has no more unallocated data.

21. A method of allocating data in a communication system having a plurality of bins for sending data, the method comprising the steps of:

defining an initial signal-to-noise value for each of the plurality of bins;

defining a reference signal-to-noise value;

calculating a projected signal-to-noise margin for each of the plurality of bins based on the initial signal-to-noise value and the reference signal-to-noise value;

selecting a best bin and a next best bin from the plurality of bins based on the projected signal-to-noise margin;

determining a minimum amount of data to allocate to the best bin, wherein the minimum amount of data causes the best bin to have a new projected signal-to-noise margin worse than that of the next best bin; and allocating the minimum amount of data to the best bin.

22. A method of re-allocating data in a communication system having a plurality of bins for sending data, the method comprising the steps of:

defining a margin threshold;

defining an initial signal-to-noise value for each of the plurality of bins;

defining a reference signal-to-noise value for each possible amount of data;

calculating a current signal-to-noise margin for an each of the plurality of bins based on the initial signal-to-noise value and the reference signal-to-noise value for each of the plurality of bins;

calculating a projected signal-to-noise margin for each of the plurality of bins based on the initial signal-to-noise value and the reference signal-to-noise value;

selecting N best bins from the plurality of bins based on the projected signal-to-noise margin, wherein the N best bins have a best bin having a best projected signal-to-noise margin;

selecting M worst bins from the plurality of bins based on the current signal-to-noise margin, wherein the M worst bins have a worst bin having a worst current signal-to-noise margin;

calculating a signal-to-noise difference based on the best bin and the worst bin;

swapping a portion of data from the M worst bins to the N best bins if a threshold value is greater than the margin threshold, wherein the step of swapping creates modified bins;

recalculating the projected signal-to-noise margin and the current signal-to-noise margin for the modified bins; and repeating the steps of selecting N, selecting M, calculating, swapping, and recalculating while the threshold value is greater than the margin threshold.

23. The method of claim 22, further comprising the step of:
reallocating the data during a transmission.

24. The method of claim 22, wherein the step of swapping further comprises:
swapping the threshold value where the threshold value is equal the projected signal-to-noise margin of the best bin less the current signal-to-noise margin of the worst bin.

25. A method of allocating data in a data communication system having a plurality of bins for sending data, the data communication system method comprising the steps of:
defining an initial signal-to-noise value for each of the plurality of bins;
defining a reference signal-to-noise value;
defining an initial bin loading;
calculating a first signal-to-noise margin for each of the plurality of bins based on the initial signal-to-noise value, reference signal-to-noise value, and initial bin loading;
selecting a bin from the plurality of bins based on the first signal-to-noise margin; and
modifying a portion of the data in the bin.

26. The method of claim 25, wherein the step of calculating includes calculating a current signal-to-noise margin as the first signal-to-noise margin.

27. The method of claim 26, wherein the step of selecting includes selecting the bin that has the worst current signal-to-noise margin.

28. The method of claim 25, wherein the step of calculating includes calculating a projected signal-to-noise margin as the first signal-to-noise margin.

29. The method of claim 28, wherein the step of selecting includes selecting the bin that has the best projected signal-to-noise margin.

30. The method of claim 25, wherein step of defining an initial bit loading includes defining the initial bit loading to be zero.

31. The method of claim 25, wherein step of defining an initial bit loading includes defining the initial bit loading to be greater than zero.

32. The method of claim 25 further comprising the steps of:
recalculating the first signal-to-noise margin for the best bin; and
repeating the steps of calculating, selecting, and modifying.

33. The method of claim 32, wherein the step of modifying comprises:
modifying a total number of bits to be allocated by at least one bit.

34. The method of claim 33, wherein the step of modifying comprises:
modifying the total number of bits to be allocated by removing at least one bit from the total number of bits to be allocated.

35. The method of claim 33, wherein the step of modifying comprises:
modifying the total number of bits to be allocated by adding at least one bit from the total number of bits to be allocated.

36. A method of controlling a data communications system, wherein the method comprises:
specifying a desired bit error rate;
building a base table, the base table comprising:
a plurality of bit values, wherein each one of the plurality of bit values indicates a number of bits to be transmitted by a portion of the communications system; and
a plurality of signal-to-noise reference (SNRref) values, wherein there is a one to one correspondence between each one of the plurality of signal-to-noise reference values and each one of the plurality of bit values, and each one of the plurality of signal-to-noise reference values represents a required signal-to-noise value needed to achieve the desired bit error rate.

37. The method of claim 36, further comprising the step of:
modifying at least one of the plurality of signal-to noise reference values based upon a coding gain.

38. The method of claim 36, further comprising the step of:
modifying at least one of the plurality of signal-to noise reference values based upon a desired margin.

39. The method of claim 36, further comprising the step of:
determining a number of bits to be assigned in a specific bin of the communications system by comparing an initial signal-to-noise ratio of the specific bin to the plurality of SNRref values.

* * * * *